United States Patent [19]

Inayoshi

[11] Patent Number: 4,626,060
[45] Date of Patent: Dec. 2, 1986

[54] CHANGE-OVER SWITCH

[75] Inventor: Kazumi Inayoshi, Toyota, Japan

[73] Assignee: Kojima Press Industry Co., Ltd., Aichi, Japan

[21] Appl. No.: 748,682

[22] Filed: Jun. 25, 1985

[30] Foreign Application Priority Data

Jun. 26, 1984 [JP]  Japan ............................. 59-96625[U]

[51] Int. Cl.$^4$ ............................................. H01R 13/70
[52] U.S. Cl. ............................... 339/147 P; 200/51.05
[58] Field of Search ............... 200/51.04, 51.05, 51.06, 200/51.07, 51.12; 339/147 R, 147 P, 113 L

[56] References Cited

U.S. PATENT DOCUMENTS

| | | | |
|---|---|---|---|
| 1,843,134 | 2/1932 | Knippel | 200/51.06 |
| 1,870,762 | 8/1932 | Winter | 200/51.05 |
| 3,960,428 | 6/1976 | Naus et al. | 339/113 L |
| 4,185,881 | 1/1980 | Foley et al. | 200/51.07 |
| 4,196,409 | 4/1980 | Juba | 339/147 P |
| 4,350,407 | 9/1982 | Tong | 339/113 L |
| 4,390,757 | 6/1983 | Wiessner | 200/292 |
| 4,428,642 | 1/1984 | Schwindt et al. | 339/276 SF |

*Primary Examiner*—Gil Weidenfeld
*Assistant Examiner*—Gary F. Paumen
*Attorney, Agent, or Firm*—Koda and Androlia

[57] ABSTRACT

The present invention provides a switch construction which can be used as a fan-speed changing switch in a vehicle air conditioner, one end of this switch being capable of coupling directly with a regular connector. This change-over switch may be of a rotary or slide type and includes contacts disposed therein for changing fan-speed or mode. The change-over switch also includes contacts contained therein for connecting with an illumination lamp which displays the selected fan-speed or mode. The change-over switch further includes a plurality of change-over terminals mounted in the base plate, each of the change-over terminals forming at one end a change-over contact positioned within the base plate and adapted to contact a movable contact. The portions of the change-over terminals extending outwardly from the base plate and one end of each lamp terminal are used to form connector contacts adapted to couple with a regular connector. Thus, the change-over and lamp terminals can be connected directly with an external circuit through the connector such that the change-over switch may extremely easily be mounted in the vehicle.

2 Claims, 9 Drawing Figures

CHANGE-OVER SWITCH

BACKGROUND OF THE INVENTION

1. Field of the Invention

The present invention relates to a change-over switch capable of coupling directly with a connector and particularly to such a change-over switch which can be used as fan-speed changing switch, mode changing switch and other switches in vehicle ari conditioners, which can externally select the desired contact and be coupled directly with a connector through externally extending connector contacts formed therein and which can connect with an illumination lamp.

2. Description of the Prior Art

In recent years, automobiles include various electronic controls and many electrical instruments for improving the comfortableness in the automobiles. There are necessarily required electrical wiring structures suitable for use with the electronic controls and electric instruments. One of the electric instruments is an air conditioner for maintaining the passenger room of a vehicle comformable. Air conditioner is now required that can delicately be adjusted for maintaining the passenger room more comfortable. This means that the air conditioner is made more complicated while at the same time the associated wiring or switching section becomes more complicated.

The conventional change-over switch system includes a plurality of lever or rotary switches each of which is provided for one of various functions to output a desired control signal to the corresponding one of various control instruments through a separate connector. Such a change-over switch system requires an increased space on installation. This is contorary to the requirement of recent automobiles that must improve the volumetric efficiency.

FIG. 8 of the accompanying drawings shows a prior art change-over switch used in a vehicle air conditioner, which has a switch body 10 including a plurality of change-over contact terminals contained therein. The switch includes an externally operating lever 12 for selecting the desired contact terminal. The control terminals are connected with a group of terminals in a regular connector 16 through lead wires 14 to form the desired electrical connection. Such a change-over switch can be used as a fan-speed changing switch.

In the prior art, thus, the fan-speed changing switch 10 is formed separately from the connector 16. This is apparently disadvantageous if such separate components are to be disposed in the limited space. Moreover, time is required to form electrical connections between various parts.

In the change-over switches of the above type, further, illumination lamps are required to display the operation of various instruments. The prior art switch shown in FIG. 8 also includes an illumination lamp 18 coupled with the connector 18 through lamp lead wires 20. As shown in FIG. 9, the illumination lamp 18 is rigidly secured to a display panel housing 22 to illuminate a heater control display panel 24 which is rigidly mounted on the forward portion of the display panel housing 22.

As be well-known, the heater control display panel 24 is mounted on any suitable fixed part such as vehicle instrument panel and the like. Thus, an operator can know a mode of the air conditioner which is selected by him through the change-over switch 10. This is essential for the change-over switches of this type.

In the prior art, however, the illumination lamp 18 or other mode display lamps are connected with the connector 16 through lead wires having their increased length. The presence of such illmination lamps also results in the installation of the connector 16 separately manufactured from the change-over switch.

SUMMARY OF THE INVENTION

In view of the above problems of the prior art, an object of the present invention is to provide an improved change-over switch which can directly be coupled with a connector to utilize as one of the terminals of the connector, which includes lamp terminals incorporated directly into the change-over switch and which can be reduced in size and simplified in wiring.

To accomplish the above object, the present invention provides a change-over switch adapted to couple directly with a connector, comprising a base plate and a terminal plate mounted on said base plate and including a plurality of terminals formed therein, said terminal plate also including contacts formed thereon at one end in the inside of said base plate, the other end of said terminal plate extending externally from said base plate to form connector contacts, said change-over switch being characterized in that illumination lamp terminals are provided parallel to said terminals, each of said lamp terminals extending at one end externally from said base plate to connect with the corresponding one of lamp lead wires, the other end of said lamp terminal extending externally from said base plate parallel to the connector contacts of said terminals to form a lamp connector contact, whereby the connector contacts can be used as a group of terminals in said connector.

BRIEF DESCRIPTION OF THE ACCOMPANYING DRAWINGS

DESCRIPTION OF PREFERRED EMBODIMENTS

The present invention will now be described by way of example with reference to the drawings.

Figure 1:
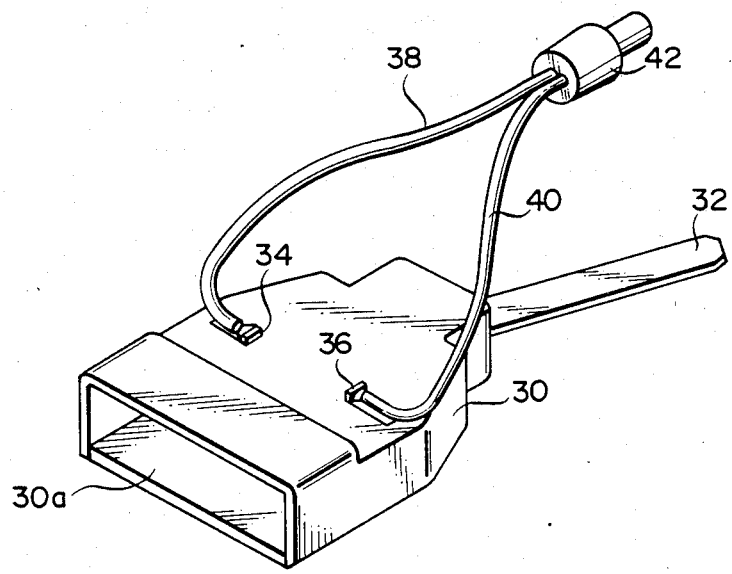
FIG. 1 is a perspective view of a preferred-embodiment of a change-over switch constructed according to the present invention.

FIG. 1 shows a change-over switch which can be used as a fan-speed changing switch for a vehicle air conditioner. The fan-speed changing switch is of a rotary type.

As can be seen from the drawings, the switch comprises a base plate 30 and an operating lever 32 associated therewith. When the operating lever 32 is pivoted by an operator in the passenger room of the vehicle, therminal positioned within the base plate 30 can be selected. As described in details hereinafter, the base plate 30 includes a plurality of such terminals each of which forms one of connector terminals directly. The base plate 30 also includes an opening 30a into which a regular connector (not shown) may be coupled to form an integral switch-connector construction.

As shown in FIG. 1, the base plate 30 has an upper face from which lamp terminals extend upwardly. The connections 34 and 36 of the lamp terminals are electrically connected with a display lamp 42 through lamp lead wires 38 and 40, respectively.

Thus, the present invention provides a change-over switch of a compact structure with easy wiring, in which the switch itself forms part of the connector and also a terminal holder for the display lamp 42.

In the illustrated embodiment, the change-over switch comprises a group of terminals each of which forms at one end a contact to be changed with the other end thereof forming a connector contact, and lamp terminals for the display lamp 42, all of these components being incorporated into the change-over switch. The group of terminals is formed as an integral type terminal plate for easy machining and assembling.

Figure 2:
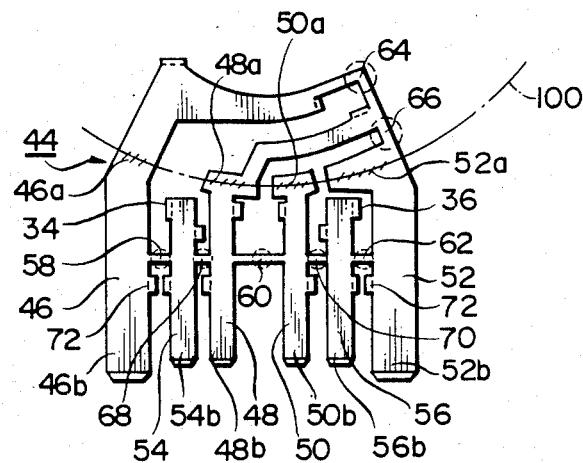
FIG. 2 is a plan view of a preferred embodiment of an integral type terminal plate which can be used in the change-over switch according to the present invention.

As can be seen from FIG. 2, the integral type terminal plate 44 is stamped from a sheet of copper and basically comprises four terminals 46, 48, 50 and 52 and lamp terminals 54 and 56. Each of the terminals 46–52 forms at one end a change contact 46a, 48a, 50a or 52a for the rotary switch, which is shown by slanting lines in FIG. 2. Although not illustrated in detail, a movable contact is adapted to move along an arcuate path shown by a chain line 100 in FIG. 2 to select one of the change contacts.

At the other end, the terminals 46–52 and lamp terminals 54 and 56 extend outwardly from the base plate to form one end portion of the connector directly as will be described hereinafter. In FIG. 2, the other ends of these terminals are shown as connector contacts 46b, 48b, 50b, 52b, 54b and 56b.

Although each of the four terminals 46–52 forms an individual terminal, the terminals 46–52 are initially coupled with the respective adjacent terminal through a connection 58, 60, 62, 64, 66, 68 and 70 in the integral type terminal plate 44 shown in FIG. 2 such that they can easily be installed on the base plate. After the terminal plate has been installed on the base plate, the connections 58–70 are cut away at broken-line circles in FIG. 2.

Each of the terminals has foldable portions 72 formed thereon at proper positions, which forldable portions 72 are utilized to engage in the corresponding apertures in the base plate so that the respective terminal can rigidly be mounted on the base plate.

Figure 3:
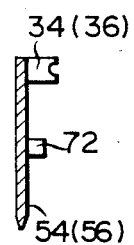
FIG. 3 is a side view of one lamp terminal in the integral type terminal plate shown in FIG. 2.

As shown in FIG. 3, each of the lamp terminals 54 and 56 forms a lead wire connection 34 or 36 which extends outwardly from the base plate, As can be seen from FIG. 1, the lead wire connections 34 and 36 are rigidly coupled with the respective lamp lead wires 38 and 40 as by soldering.

Figure 5:
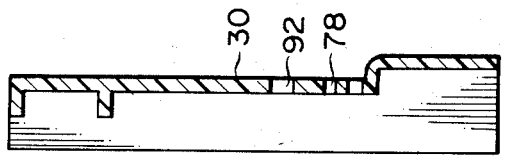
FIG. 5 is a sectional view taken along a line V—V in FIG. 4.
Figure 4:
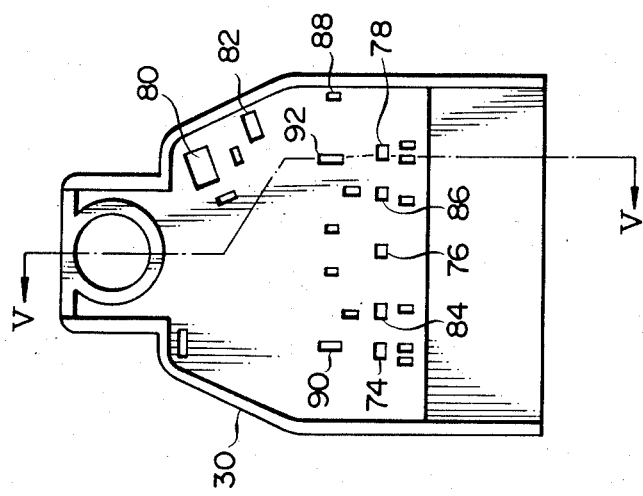
FIG. 4 is a plan view of a preferred embodiment of a base plate into which the integral type terminal plate shown in FIG. 2 can be incorporated.

FIGS. 4 and 5 shows one half portion of the base plate 30 into which the integral type terminal plate 44 according to the present invention is incorporated. The base plate 30 includes a plurality of through-apertures 74, 76, 78, 80, 82, 84 and 86 formed therein each of which is adapted to receive one of the aforementioned connections 58–70. The base plate 30 also includes a plurality of caulking through-apertures 88 formed therein at positions corresponding to the aforementioned foldable portions 72.

The connections 34 and 36 of the lamp terminals 54 and 56 extend outwardly from the base plate 30 through two through-apertures 90 and 92 formed in the base plate 30. As shown in FIG. 1, the portions of the connections 34 and 36 may be connected with the lamp lead wires 38 and 40.

Figure 7:
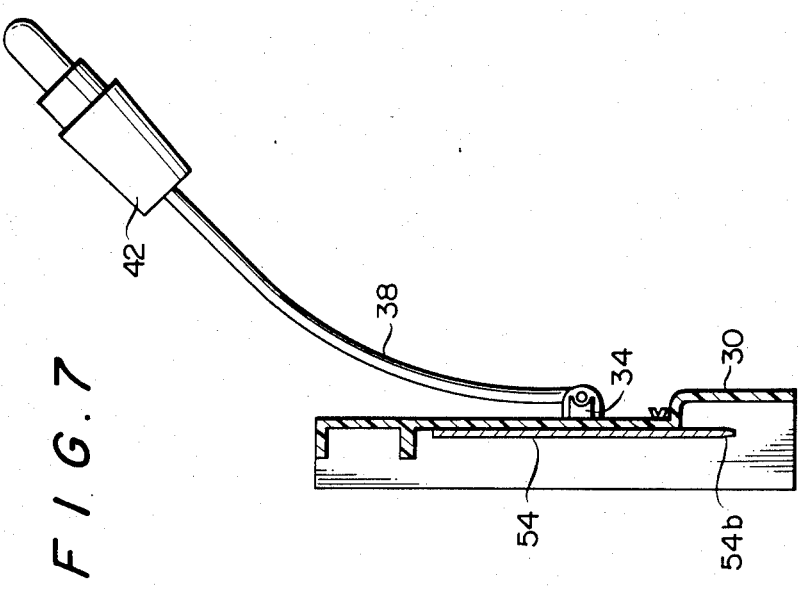
FIG. 7 is a sectional view taken along a line VII—VII in FIG. 6.
Figure 6:
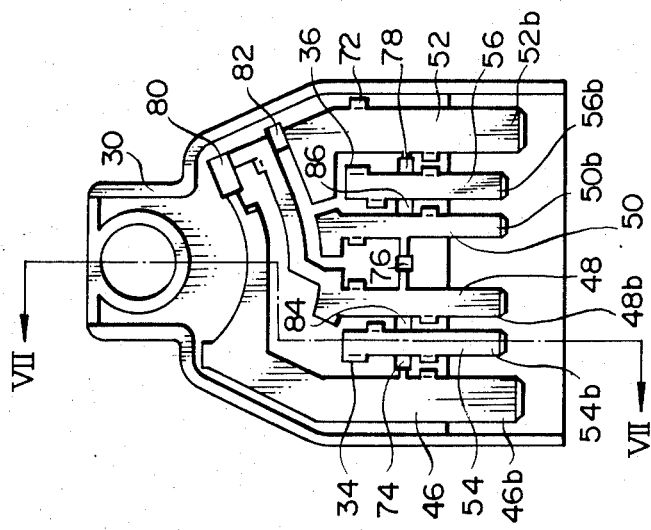
FIG. 6 is a plan view showing the integral type terminal plate incorporated into the base plate, each of the terminals thereof being cut away.
Figure 8:
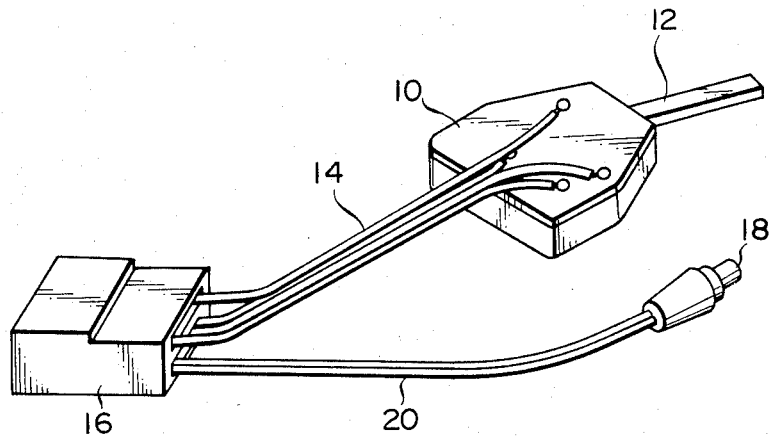
FIG. 8 is a perspective view showing one of the prior art change-over switches.
Figure 9:
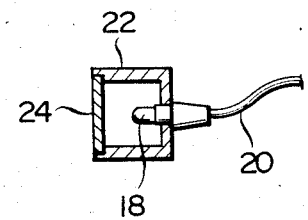
FIG. 9 is a schematic cross-section showing the mounting of a display lamp in the prior art change-over switch shown in FIG. 8.

FIGS. 6 and 7 show the integral type terminal plate 44 which after incorporated into the base plate 30, is cut away at the respective connections to separate the terminals from one another. The terminals 46–56 are rigidly mounted on the base plate 30 by caulking the foldable portions 72 against the base plate 30. After caulking, any suitable punching tool is brought onto one of the through-apertures 74–86 to cut away the corresponding one of the connections 40–48.

Thus, the terminals 46–56 are individually firmly fixed to the base plate 30 in the state shown in FIGS. 6 and 7 and also each serves as an electrically independent terminal.

The aforementioned connector contacts 46b–56b extend from the base plate 30 outwardly and downwardly as viewed in FIGS. 6 and 7 so that they will be coupled with a regular type connector.

The connection 34 of the lamp terminal 54, which extends outwardly and rightwardly as viewed in FIG. 7, is coupled with the lamp lead wire 38 as by soldering. Thus, the change-over switch itself forms a holder for the lamp terminals.

Although the present invention has been described as to the rotary type change-over switch, it may be applied to the other type switches such as a slide type switch. The number of the contacts and terminals and the configuration and thickness of their outwardly extending portions may be modified or changed according to the principle of the present invention.

It will be apparent from the foregoing that the present invention provides very easy machining and assembling since the terminals in the integral type terminal plate are cut away from one another after the terminal plate has been fixed to the base plate. Since the portion of each terminal extending outwardly from the base plate forms a connector contact, the change-over switch according to the present invention may be connected directly with any one of various type connectors.

Thus, the present invention provides an integral type change-over switch which itself forms part of a connector as well as a lamp terminal holder and which can be very reduced in size and simplified in assembling and wiring.

I claim:

1. A change-over switch capable of coupling directly with a connector, comprising a boxy type base plate and a single terminal plate including a plurality of terminals formed therein which is made by a press-punching and folding process, said terminal plate forming at one end change-over contacts in the inside of said base plate with the other end of said terminal plate forming connector contacts which extend outwardly from said base plate, said change-over switch being characterized by illumination lamp terminals being provided parallel to said terminals, each of said lamp terminals being coupled with a corresponding lamp lead wire, the other end of each of said lamp terminals extending outwardly from said base plate parallel to the connector contacts of said terminals to form a lamp connector contact, a group of said connector contacts forming one group of terminals in the switch, said terminal plate is a one-piece terminal plate, said change-over contacts and said lamp terminals are preformed into said one-piece terminal plate which can rigidly be mounted on said base plate in such a state that the terminals are connected with one another through connections, said connections being cutaway to separate said terminals from one another after said terminal plate has been fixed to said base plate, and an operating rotary lever is swingably provided on the base plate with a movable contact which is adapted to move along an arcuate path to engage the change-over contacts of the terminal plate.

2. A change-over switch as defined in claim 1, characterized in that said change-over switch is a rotary switch wherein said change-over contacts disposed in the inside of said base plate are arranged along an arc of a given circle, the inward ends of said lamp terminals being arranged out of said circle and said change-over contacts and lamp terminals being located in the same plane.

* * * * *